April 16, 1929.　　R. N. VICKERS　　1,708,981
WRIST PIN
Filed Aug. 24, 1927
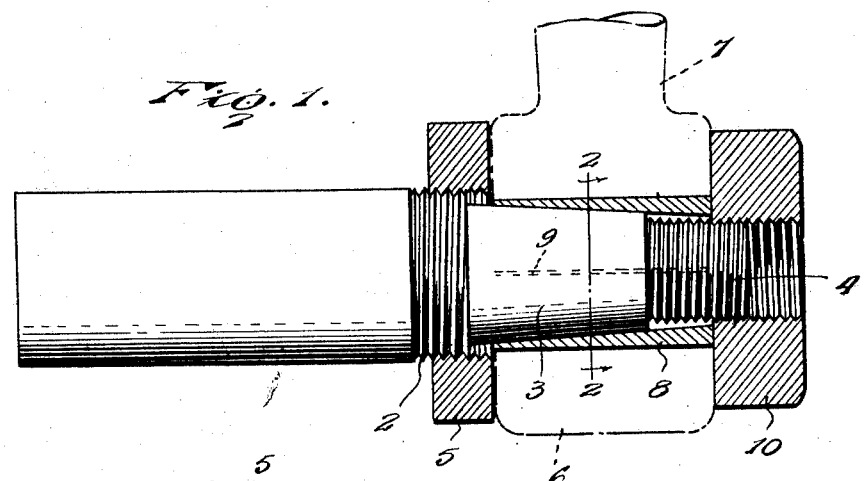
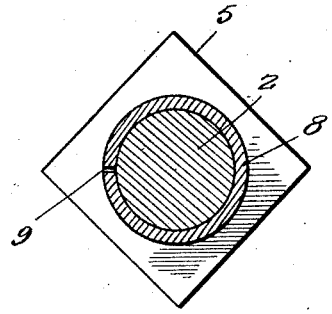
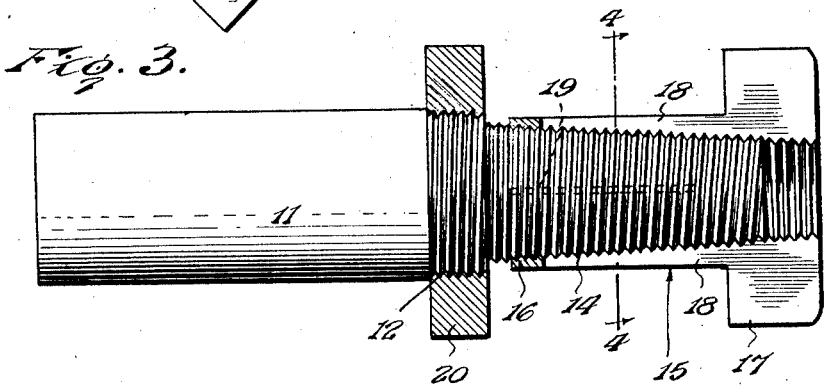
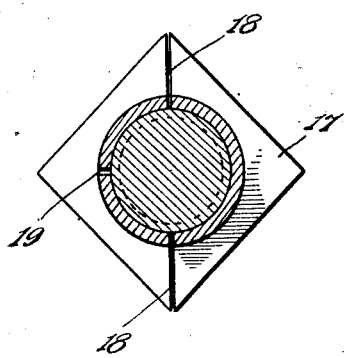
Inventor
R. N. Vickers.
By Lacey & Lacey, Attorneys Patented Apr. 16, 1929.

1,708,981

UNITED STATES PATENT OFFICE.

RICHARD N. VICKERS, OF SMACKOVER, ARKANSAS.

WRIST PIN.

Application filed August 24, 1927. Serial No. 215,146.

The present invention is directed to improvements in wrist pins.

The primary object of the invention is to provide a device of this character so constructed that it can be easily and quickly adjusted to compensate for wear.

Another object of the invention is to provide a device of this character including a split bushing capable of snugly fitting a tapered shank and being adjustable in a simple manner to expand the bushing to take up wear upon the parts.

In the accompanying drawing:

Figure 1 is a longitudinal sectional view of the device.

Figure 2 is a sectional view on line 2—2 of Figure 1.

Figure 3 is a longitudinal sectional view of a modified form of the device.

Figure 4 is a sectional view on line 4—4 of Figure 3.

Referring to the drawing, 1 designates the wrist pin which is provided with a threaded portion 2 and a tapered shank 3, the latter terminating in a threaded reduced extension 4. A nut 5 is threaded upon the portion 2 and serves as an abutment for the bearing 6 of the connecting rod or pitman 7.

Engaged upon the shank 3 is a bushing 8, split longitudinally, as at 9, and is of such length that it may be adjusted upon the shank to expand the same to take up wear. Threaded upon the extension 4 is a nut 10 which is adapted to bear against the outer end of the bushing 8 so that when it is screwed inwardly the bushing will be moved in order to expand the same to take up the wear. It will be of course understood that when adjustment is to be made that the nut 5 will be first screwed inwardly upon the threaded portion 2 in order that the bushing may move laterally a slight distance.

In the modified form of the invention, as shown in Figures 3 and 4, the pin 11 is also provided with a threaded portion 12 and the shank 13 is tapered, and instead of being smooth, as in the preferred form of the invention, it is provided with threads 14 throughout its length. The bushing 15 is provided with threads 16 for engaging the threads 14 of the shank, and has its outer end formed with a head 17 which constitutes a nut for adjusting the bushing. The bushing 15 is provided with diametrically opposite splits 18 which extend from a point adjacent the inner end of the bushing and through the head 17, said bushing also being provided with a split 19 which stops at a point short of the head 17 and opens in the inner end of the bushing. It will be obvious that upon rotating the bushing 15 through the medium of the head 17 that it can be threaded inwardly and owing to the presence of the splits 18 and 19 the bushing will be expanded to take up wear. A nut 20 is engaged on the threaded portion 12 and also serves as an abutment for the bushing, it being of course necessary that this nut be adjusted corresponding to the adjustment necessary upon the bushing.

Having thus described the invention, I claim:

The combination with a wrist pin having a tapered shank, of a split bushing engaged upon the shank, the shank having a threaded portion at one end and a threaded extension upon the other end, nuts engaged upon said portion and extension for engagement with the side of a bearing engaged upon the bushing, the nut upon the extension being adjustable to move the bushing upon the shank to expand the same for intimate engagement with the bearing, and the nut upon the threaded portion being adjustable to permit adjustment of the bearing.

In testimony whereof I affix my signature.

RICHARD N. VICKERS. [L. S.]